Patented Apr. 21, 1925.

1,534,485

UNITED STATES PATENT OFFICE.

MINNITA BAILEY, OF NEW YORK, N. Y.

TOOTHACHE REMEDY.

No Drawing.   Application filed July 12, 1924. Serial No. 725,696.

*To all whom it may concern:*

Be it known that I, MINNITA BAILEY, a citizen of the United States, residing at New York city, county of New York, borough of Manhattan, and State of New York, have invented new and useful Improvements in Toothache Remedies, of which the following is a full, clear, and exact specification.

My invention relates to medicinal products and refers particularly to medicinal remedies for the treatment and relief of toothache.

Numerous remedies for toothache have been proposed and many of them have been applied with a degree of success, but they usually have the physical properties of a liquid or of an exceedingly firm wax or gum.

A liquid toothache remedy has the great disadvantage that it can not be maintained in contact with any desired spot for a considerable length of time, but will flow away from the place of contact, thus defeating the purpose of its use. Further, as many of the remedies have a tendency of irritating the skin, this form of medicinal product is highly objectionable, due especially to the tenderness of the mouth lining.

The usually employed wax, or gum, remedies are of such stiff and firm physical condition as not to be readily fitted completely within a tooth cavity, and hence, do not come into contact with the source of pain. Further, there are serious objections to the complete closing of a decayed tooth cavity with a product of such firm consistency.

I have overcome these objectionable features, as well as others, which are evident upon a consideration of the subject matter, by producing a remedy in paste form, of such firmness as not to run, thus allowing of its maintenance at a desired spot and which is, at the same time, soft enough to allow it to be inserted within a cavity in contact with the entire inner surface thereof, thus accomplishing full efficiency of the remedial products employed.

I have further found that ground mustard seed, especially black mustard seed, is highly efficacious as a toothache remedy, especially in conjunction with other products, the physical condition of the solid seed products being such that the remedial agencies contained therein can be employed without the danger and pain incident to the employment of the strong oils and extracts contained therein and obtained therefrom.

While the ground black mustard seed may be employed alone with a paste, such as petrolatum, I prefer to combine it with certain other oils, such as peppermint, terebinthinae and similar oils.

A highly valuable and effective remedy can be made as follows:—

14 per cent oleum sinapis, 6 per cent oleum menthae piperita, 2 per cent oleum terebinthinae, 23 per cent white petrolatum and 55 per cent ground black mustard seed.

The oleum sinapis may be omitted and the ground black mustard seed increased to 69 per cent.

My invention relates particularly to the employment of ground mustard seed in conjunction with, and thoroughly mixed with, petrolatum or a similar product.

I do not limit myself to the particular ingredients, or proportions of ingredients, mentioned in conjunction with the ground mustard seed, as these may be varied, or changed, without going beyond the scope of my invention.

What I claim is:—

1. In a medicinal product, suitable for the relief of toothache, in combination, ground black mustard seed, oleum menthae piperita, oleum terebinthinae, oleum sinapis and petrolatum.

2. In a medicinal product, suitable for the relief of toothache, in combination, approximately 14 per cent oleum sinapis, 6 per cent oleum menthae piperita, 2 per cent oleum terebinthinae, 23 per cent white petrolatum and 55 per cent ground black mustard seed.

Signed at New York city in the county of New York and State of New York this 11th day of July, 1924.

MINNITA BAILEY.